April 21, 1925.  W. E. FOWLER, JR  1,534,579
BRAKE BEAM
Filed May 8, 1923  2 Sheets-Sheet 1
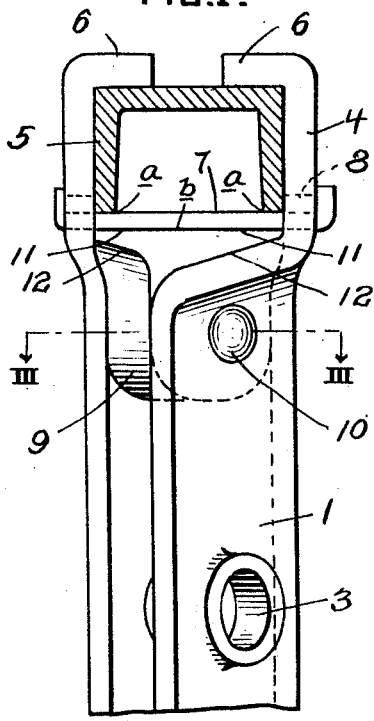
FIG.1.
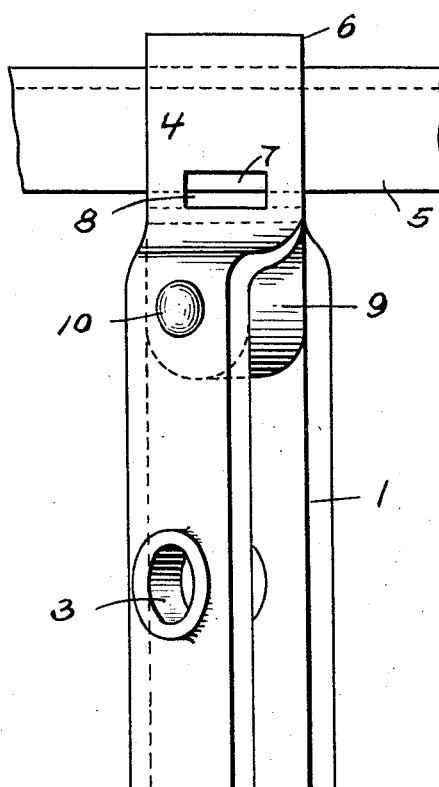
FIG.2.
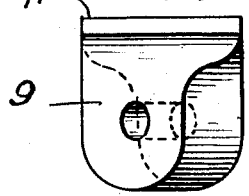
FIG.3.
FIG.4.
WITNESSES
INVENTOR
William E. Fowler Jr.
by Dennis S. Wolcott
Atty April 21, 1925.  
W. E. FOWLER, JR  
BRAKE BEAM  
Filed May 8, 1923

1,534,579

2 Sheets-Sheet 2

WITNESSES
J. Herbert Bradley.

INVENTOR
William E. Fowler Jr
by Damon S. Wolcott
Atty

Patented Apr. 21, 1925.

1,534,579

UNITED STATES PATENT OFFICE.

WILLIAM E. FOWLER, JR., OF MOUNT LEBANON, PENNSYLVANIA, ASSIGNOR TO DAVIS BRAKE BEAM COMPANY, OF JOHNSTOWN, PENNSYLVANIA, A CORPORATION OF PENNSYLVANIA.

BRAKE BEAM.

Application filed May 8, 1923. Serial No. 637,491.

*To all whom it may concern:*

Be it known that I, WILLIAM E. FOWLER, Jr., residing at Mount Lebanon, in the county of Allegheny and State of Pennsylvania, a citizen of the United States, have invented or discovered certain new and useful Improvements in Brake Beams, of which improvements the following is a specification.

The invention described herein relates to certain improvements in brake beams of the truss type, the invention relating specifically to a construction of brake beam wherein the strut, consisting of spaced side-bars or legs, is preferably formed by bending a flat strip of metal to U-shape and has for its object the provision of means whereby one end of the strut may be caused to tightly grip the compression member. The invention is hereinafter more fully described and claimed.

Figure 5:
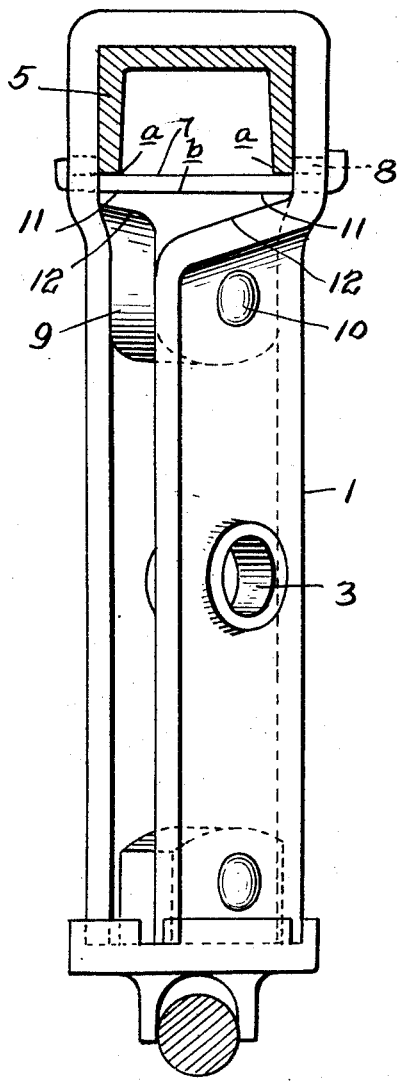

In the accompanying drawings forming a part of this specification, Fig. 1 is a side elevation of a strut having one end gripping the compression member, the latter being shown in section; Fig. 2 is a view of the strut and compression member at right angles to position shown in Fig. 1; Fig. 3 is a sectional view on a plane indicated by the line III—III, Fig. 1; Fig. 4 is a view of the abutment and spacing block; Fig. 5 is a view similar to Fig. 1 showing the arrangement of the compression member in the closed end of a U-shaped strut; and Fig. 6 is an elevation showing a modification in the shape of the compression member.

In the construction shown herein the strut is preferably formed by bending a strip of metal to U-shape. The legs immediately in the rear of the portions designed to engage the compression member 2 which forms the front portion of the brake beam are twisted in order to insure the proper position of the lever which is pivotally supported on a pin passing through holes 3 in the legs. As the mounting of the lever referred to will be in accordance with the usual practice and does not form any part of the invention claimed herein, it is not shown. When the compression member which is preferably of a structural shape, is to be secured between the front ends of side bars or the open end of a U-shape member, portions 4 of the legs or side bars are spaced so as to bear against the sides or flanges 5 of the compression member and the ends 6 of the portions 4 are bent inwardly so as to bear against the web of the member 2 as clearly shown in Fig. 1. In order to draw the portions 6 of the strut tightly against the compression member, a wedge 7 is driven through holes 8 so formed in the legs or bars that the wedge will bear against the edges $a$ of the compression member and the rear sides of the holes. It will be observed that these holes extend a little in front of the edges $a$ so that the wedge, when driven to position, will have a drawing action on the legs or bars, the rear edges of the holes serving as bearing or abutments for the wedge so that when the latter is driven in it will force the compression member against the flanges on the legs of the strut.

In order to facilitate the insertion of the wedge, provision is made for guiding it. In the construction shown, the guide is formed by the surface $b$ of the block 9 which also serves as a spacer to prevent any bending of the legs by the bolt 10, whereby portions of the legs are drawn against the sides of the compression member. As shown this block is provided with wings 11 adapted to bear, when the spacer is in operative position, on the shoulders 12 formed by twisting the legs or bars as above described. The block is so constructed that when in position the surface $b$ will be in alinement with the rear edges of the holes 8 in the legs and will guide the wedge when being driven into position. It will also be observed that these wings extend over the edges $a$ of the compression member and as the wings bear against the shoulders 12 of the legs, they form bearings or abutments for the wedge directly opposite the edges $a$ of the compression member.

Figure 6:
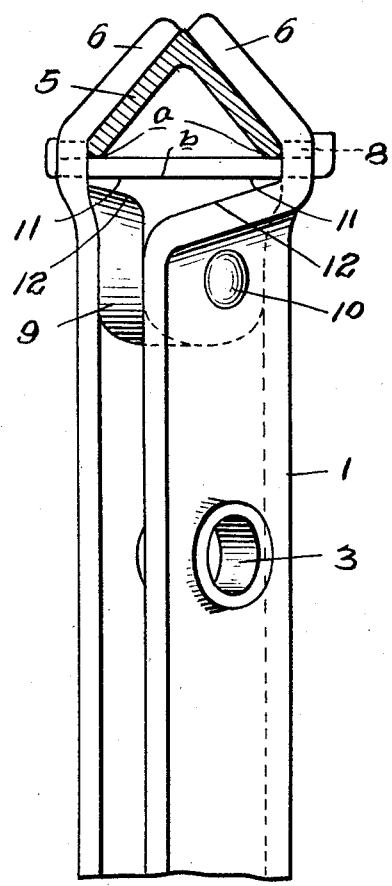

As shown in Fig. 5 the closed end of a U-shaped strut may be constructed to engage the compression member and the latter may be in the form of an angle as shown in Fig. 6.

I claim herein as my invention:

1. A brake beam having in combination a structural compression member, a strut formed by bending a strip of metal to U-shape, the sides or legs at one end of the strut being adapted to grip the compression member, a wedge passing through the sides or legs and bearing on the compression member, a spacing block arranged between the legs and adapted to serve as a guide for the wedge.

2. A brake beam having in combination a structural compression member, a strut formed by bending a strip of metal to U-shape, the sides or legs at one end of the strut engaging the compression member, said sides or legs being provided with shoulders, a wedge passing through the sides or legs and bearing on the compression member, a spacing block arranged between the legs having lateral extensions or wings adapted to bear against the shoulders on the legs, said spacer being so arranged between the legs that the wings will guide the wedge, when driven, to position.

In testimony whereof, I have hereunto set my hand.

WILLIAM E. FOWLER, Jr.